(12) United States Patent
Shpeisman et al.

(10) Patent No.: US 8,364,911 B2
(45) Date of Patent: Jan. 29, 2013

(54) EFFICIENT NON-TRANSACTIONAL WRITE BARRIERS FOR STRONG ATOMICITY

(75) Inventors: Tatiana Shpeisman, Menlo Park, CA (US); Ali-Reza Adl-Tabatabai, Santa Clara, CA (US); Vijay Menon, Seattle, WA (US); Bratin Saha, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/182,162

(22) Filed: Jul. 13, 2011

(65) Prior Publication Data

US 2011/0271017 A1    Nov. 3, 2011

Related U.S. Application Data

(62) Division of application No. 11/967,232, filed on Dec. 30, 2007, now Pat. No. 8,065,491.

(51) Int. Cl.
*G06F 12/00* (2006.01)
*G06F 13/14* (2006.01)

(52) U.S. Cl. .................................... 711/152; 710/200
(58) Field of Classification Search ................. None
See application file for complete search history.

(56) References Cited

U.S. PATENT DOCUMENTS

| 5,872,980 A * | 2/1999 | Derrick et al. ............... 710/200 |
| 2008/0163220 A1 | 7/2008 | Wang et al. |
| 2009/0089520 A1 | 4/2009 | Saha et al. |

* cited by examiner

*Primary Examiner* — Denise Tran
(74) *Attorney, Agent, or Firm* — Blakely, Sokoloff, Taylor & Zafman LLP (57) ABSTRACT

A method and apparatus for providing optimized strong atomicity operations for non-transactional writes is herein described. Locks are acquired upon initial non-transactional writes to memory locations. The locks are maintained until an event is detected resulting in the release of the locks. As a result, in the intermediary period between acquiring and releasing the locks, any subsequent writes to memory locations that are locked are accelerated through non-execution of lock acquire operations.

18 Claims, 4 Drawing Sheets

FIG. 4 ns with a hash table holds a text, extracting...

EFFICIENT NON-TRANSACTIONAL WRITE BARRIERS FOR STRONG ATOMICITY

CROSS-REFERENCE TO RELATED APPLICATION

This application is a divisional of application Ser. No. 11/967,232, filed Dec. 30, 2007, now U.S. Pat. No. 8,065,491, which was issued on Nov. 22, 2011. This application is incorporated herein by reference in its entirety.

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict. One type of transactional execution includes a Software Transactional Memory (STM), where accesses are tracked, conflict resolution, abort tasks, and other transactional tasks are performed in software.

In weakly atomic transactional memory systems, often, only transactional access are tracked. In contrast, in strongly atomic transactional memory systems, to ensure runtime conflicts between transactional memory operations and non-transactional memory operations do not occur, compilers treat each non-transactional memory operation as a single operation transaction. In other words, transactional operations are inserted at non-transactional memory accesses to isolate transactions from affecting non-transactional code. However, execution of extensive barriers at every non-transactional memory operation potentially wastes execution cycles through inefficient barrier code execution.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware/software support for transactional execution, specific shared memory access tracking, specific locking/versioning/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific and alternative multi-core and multi-threaded processor architectures, transaction hardware, cache organizations, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portion of the values. In addition, the terms reset and set, in one embodiment, refer to a default and an updated value or state, respectively. For example, a default value potentially includes a high logical value, i.e. reset, while an updated value potentially includes a low logical value, i.e. set.

The method and apparatus described herein are for providing efficient non-transactional write barriers in a transactional memory (TM) system. Specifically, providing strong atomicity is primarily discussed in reference to an (STM) system utilizing compiler inserted transactional memory operations. However, the methods and apparatus for providing strong atomicity are not so limited, as they may be implemented on or in association with any transactional memory system.

Figure 1:
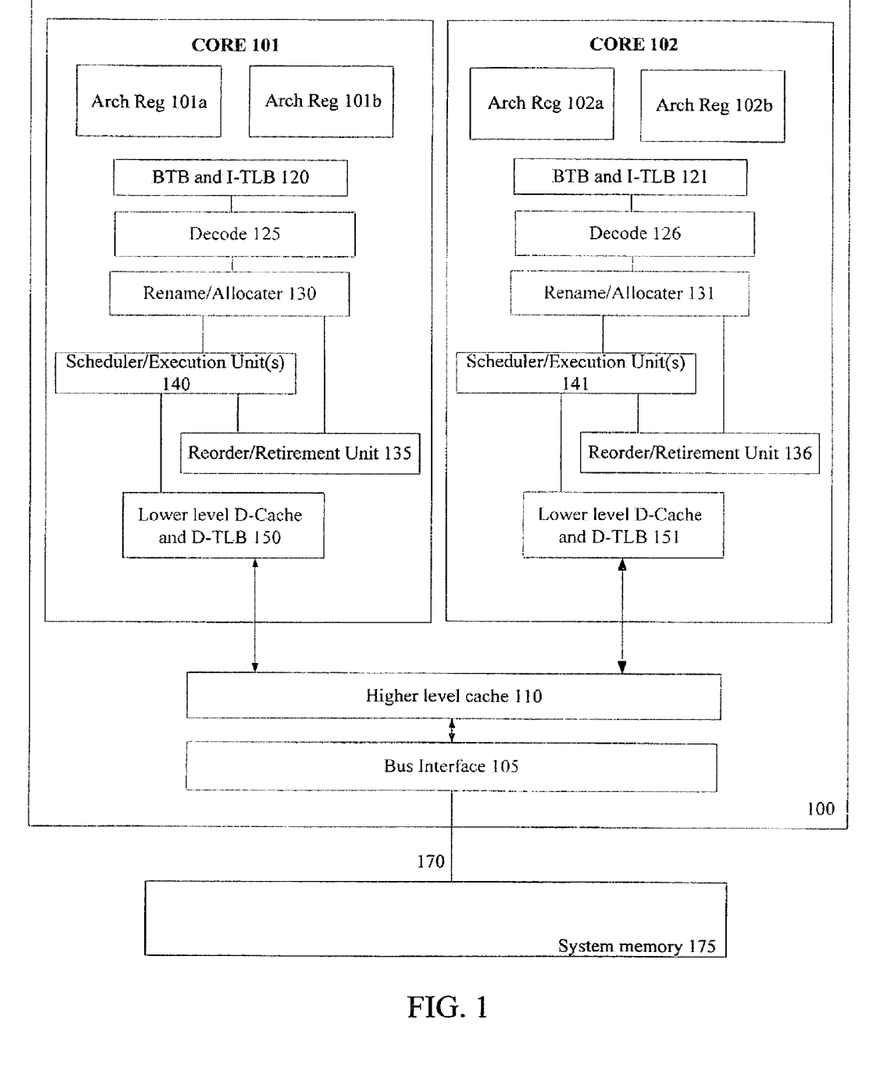
FIG. 1 illustrates an embodiment a system capable of providing efficient non-transactional write barriers.

Referring to FIG. 1, an embodiment of a multi-processing element processor capable of providing efficient non-transactional write barriers in a transactional memory (TM) system is illustrated. A processing element refers to a thread, a process, a context, a logical processor, a hardware thread, a core, and/or any processing element, which shares access to resources of the processor, such as reservation units, execution units, pipelines, and/or higher level caches/memory. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. Physical processor 100, as illustrated in FIG. 1, includes two cores, core 101 and 102, which share access to higher level cache 110. In addition, core 101 includes two hardware threads 101a and 101b, while core 102 includes two hardware threads 102a and 102b. Therefore, software entities, such as an operating system, potentially view processor 100 as four separate processors, while processor 100 is capable of executing four software threads.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. In other words, software views two cores or threads on a physical processor as two independent processors. Additionally, each core potentially includes multiple hardware threads for executing multiple software threads. Therefore, a processing element includes any of the aforementioned elements capable of maintaining a context, such as cores, threads, hardware threads, virtual machines, or other resources.

In one embodiment, processor 100 is a multi-core processor capable of executing multiple threads in parallel. Here, a first thread is associated with architecture state registers 101a, a second thread is associated with architecture state registers 101b, a third thread is associated with architecture state registers 102a, and a fourth thread is associated with architecture state registers 102b. Reference to processing elements in processor 100, in one embodiment, includes reference to cores 101 and 102, as well as threads 101a, 101b, 102a, and 102b. In another embodiment, a processing element refers to elements at the same level in a hierarchy of processing domain. For example, core 101 and 102 are in the same domain level, and threads 101a, 101b, 102a, and 102b are in the same domain level, as they are all included within a core's domain.

Although processor 100 may include asymmetric cores, i.e. cores with different configurations, functional units, and/or logic, symmetric cores are illustrated. As a result, core 102, which is illustrated as identical to core 101, will not be discussed in detail to avoid obscuring the discussion.

As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Bus interface module 105 is to communicate with devices external to processor 100, such as system memory 175, a chipset, a northbridge, or other integrated circuit. Memory 175 may be dedicated to processor 100 or shared with other devices in a system. Examples of memory 175 includes dynamic random access memory (DRAM), static RAM (SRAM), non-volatile memory (NV memory), and long-term storage.

Typically bus interface unit 105 includes input/output (I/O) buffers to transmit and receive bus signals on interconnect 170. Examples of interconnect 170 include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol. Bus interface unit 105 as shown is also to communicate with higher level cache 110.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decode traces. Module 120 also potentially includes a branch target buffer to predict branches to be executed/taken and an instruction-translation buffer (I-TLB) to store address translation entries for instructions. Here, a processor capable of speculative execution potentially prefetches and speculatively executes predicted branches.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. In fact, instructions/operations are potentially scheduled on execution units according to their type availability. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. As a specific example, a processor may include a page table structure to break physical memory into a plurality of virtual pages. Data cache 150 may be utilized as a transactional memory or other memory to track tentative accesses during execution of a transaction, as discussed in more detail below. Furthermore, when tracking tentative accesses utilizing a STM system, software tables/data may be held in system memory 175 and cached in lower level cache 150.

A transaction, which may also be referred to as a critical section of code, includes a grouping of instructions, operations, or micro-operations, which may be grouped by hardware, software, firmware, or a combination thereof. For example, instructions or operations may be used to demarcate a transaction or a critical section. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible.

However, if the transaction is invalidated during its pendancy, the transaction is restarted without making the updates globally visible. As a result, pendancy of a transaction, as used herein, refers to a transaction that has begun execution and has not been committed or aborted, i.e. pending. Example implementations for transactional execution include a Hardware Transactional Memory (HTM) system, a Software Transactional Memory (STM) system, and a combination thereof.

A Hardware Transactional Memory (HTM) system often refers to tracking access during execution of a transaction with processor 100 in hardware of processor 100. For example, cache 150 is to cache a data item/object from system memory 175. During execution of a transaction, an annotation/attribute field is associated with a cache line in cache 150, which is to hold the data object. The annotation field is utilized to track accesses to and from the cache line. In one embodiment, the annotation field includes a read storage cell and a write storage cell. Each of the storage cells is set upon the corresponding read or write to indicate if a read or write has occurred during a pendancy of a transaction. As a result, if a write to a cache line that has its read bit set to indicate a load has occurred, then a conflict is detected, as a line loaded from has been written to during a pendancy of a transaction.

A Software Transactional Memory (STM) system often refers to performing access tracking, conflict resolution, or other transactional memory tasks in or at least partially in software. As a general example, a compiler, when executed, compiles program code to insert read and write barriers for load and store operations, accordingly. A compiler may also insert other transaction and non-transaction related operations, such as commit operations, abort operations, bookkeeping operations, conflict detection operations, and strong atomicity operations.

As stated above, previously non-transactional memory operations are treated as single transactions. Usually, a compiler inserts operations at the non-transactional memory access to ensure strong atomicity, i.e. to isolate transactional memory accesses from non-transactional memory accesses. An example of a previous operation inserted at a non-transactional memory access operation to ensure strong atomicity includes a lock acquire operation/function to acquire a lock for a memory location before writing to the memory location and lock release operation/function to release a lock for a memory location after writing to the memory location. However, re-acquiring a lock during every non-transactional write to a memory location, which has been previously accessed is potentially wasteful.

Therefore, in one embodiment, efficient strong atomicity write operations are inserted at non-transactional writes, when executed, to provide efficient/optimized non-transactional write barriers. As an example, upon a first write to a memory location a write barrier is executed, such as acquiring a transaction record/lock associated with the memory location. The previous value of the lock/transaction record is stored and the lock/transaction record is not immediately released after performing the non-transactional write. As a result, subsequent non-transactional writes to the memory location may elide the lock acquisition and execute limited write barriers, such as determining if the lock/transaction record is owned. If the lock is already owned, then the non-transactional write is performed without extensive bookkeeping. In one embodiment, the transaction record/lock is owned until encountering a lock release event, such as starting a transaction, an overflow of a storage area holding the previous lock values, attempting to acquire a lock owned by another transaction, and being requested by another processing element to release locks. More detail of providing efficient strong atomicity write barriers is discussed below.

Figure 2:
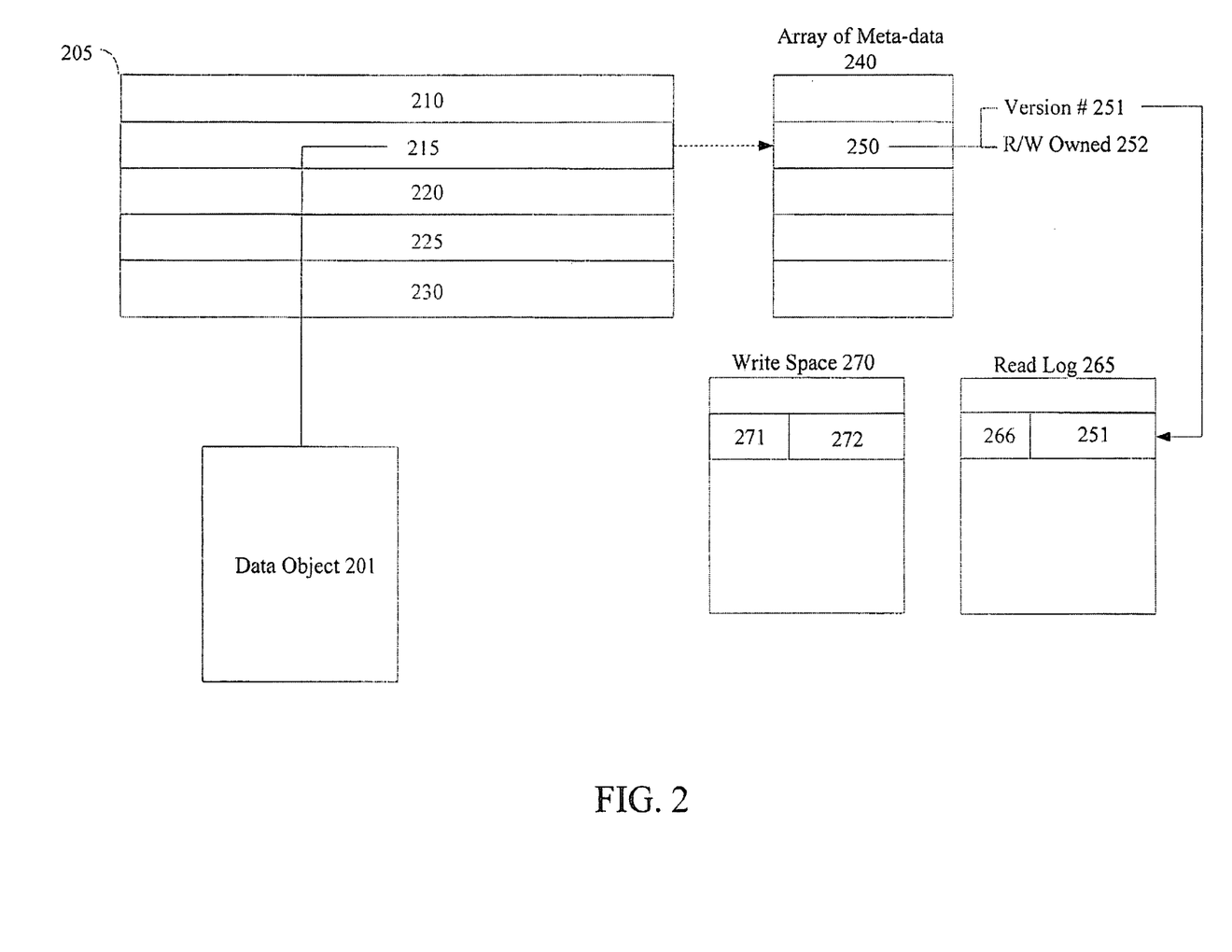
FIG. 2 illustrates an embodiment of a Software Transactional Memory (STM) system.

Referring to FIG. 2, a simplified illustrative embodiment of a STM system is depicted. Data object 201 includes any granularity of data, such as a word, a data element/operand, an instruction, a line of memory, a cache line, a programming language defined object, a field of a programming language defined object, and a table. Note that read log 265 and write space 270 may be a data object, such as data object 201, which is to be held in a system memory and cached in cache 205.

In one embodiment, a write to data object 201 updates cache line 215 with a new value, and old value 272 is held corresponding to address 271 in write space 270. Here, address 271 includes any representation of an address associated with line 215 and/or data object 201, such as a virtual address, linear address, physical address, or portion thereof. Upon committing the transaction, the old values in write log 270, such as value 272, are discarded and the tentative values held in line 215 are made globally visible, and conversely, upon aborting the transaction, the old values, such as value 272, are restored to the original locations, such as line 215, overwriting the tentatively held values. Often, this type of software transactional memory (STM) system is referred to as a write log STM or an in-place update STM, as write space 270 resembles a write log to hold old values, while tentative transaction values are "updated in-place" within cache 205.

In another embodiment, a write to data object 201 is buffered in write space 270, which resembles a write buffer, while old values remain in their original locations. Here, write buffer 270 holds tentative transaction value 272 to be written to location 215. Upon aborting the transaction, the tentative values held in write buffer 270 are discarded, and conversely, upon committing the transaction, the tentative values, such as value 272, are copied to the corresponding memory locations overwriting the old values. Often, this type of software transactional memory (STM) system is referred to as a write buffering STM, as write space 270 resembles a write buffer with tentative transaction values being buffered/held in write space 270.

In one embodiment, write space 270 includes a storage area to hold previous transaction record values for strongly atomic non-transactional writes. Note that write space 270 to hold previous transaction record values may be utilized in an update-in-place STM, as well as in a write-buffering STM. As an example, when a non-transactional write to line 215 is encountered, transaction record 250 is acquired. Previous value, i.e. version 251, is stored as value 272 in write space/buffer 270 corresponding to address 271. Subsequent non-transactional writes to the same memory location do not need to perform similar write buffer operations, such as acquiring transaction record 250 and storing version value 251 in write space 270. Furthermore, when encountering a lock release event, buffer 270 is flushed, resulting in the release of owned transaction records. Here, version value 272 is incremented to a next version value and stored in transaction record 250 to indicate line 250 is un-owned.

Here, write space 270 is illustrated as having multiple potential functions, i.e. a write buffer for buffering tentative values, a write log for logging old values, and/or a write buffer/space for holding previous transaction record/lock values. In fact, a single write space may be re-used for each of these functions. In contrast, separate write space storage areas may be included for each use or any combination thereof. In one embodiment, each processing element is associated with a separate write buffer to buffer previous transaction record/lock values.

Note, that write space 270 may include any storage area. In one embodiment, write space 270 is a higher level memory, such as a second level cache or system memory. In another embodiment, write space 270 may be a separate write space held in registers or other locations of memory. Write space 270 may resemble a lookup table with an address associated with a corresponding value. In yet another embodiment, write space 270 may include a program stack, separate stack, or other software controlled structure held in any of the aforementioned storage areas or a separate storage area.

For STM operation, whether write space 270 is utilized as a write-buffer to buffer tentative values or a write-log to log old values, a transactional write, when committed, releases lock 250. As stated above, a lock/transaction record may be held for a plurality of transactional writes and released in response to encountering a lock release event. In one embodiment, releasing transaction record/lock 250 includes returning meta-data location 250 to a value that represents an unlocked or un-owned state. As an example, the value is incremented from a previous value to represent a new unlocked version value 251.

To illustrate, assume meta-data location 250 holds a version value of two initially to indicate that line 215 is unlocked/un-owned. When a non-transaction write is encountered, meta-data location is updated to owned value 252 of three. Note owned value 252 may include any value, such as a value to represent which processing element owns the location, i.e. a processing element identifier value. The previous transaction record value of two is stored in write space 270 as value 272. Upon encountering a lock release event, such as a buffer overflow of write space 270, transaction record 250 is released. In one embodiment, the old un-owned value of two is written back to location 250. In another embodiment, an incremented version of the previous value of two, such as a value of four, is written back to location 250 to indicate both that line 215 is un-owned and that line 215 has been updated, i.e. location 250 has updated from a version of two to a version of four. This versioning allows for transactions to validate their reads that loaded data object 201 by comparing their logged version values in their read logs to current version value 251.

The example above includes one embodiment of implementing an STM; however, any known implementation of an STM may be used. In fact, any known system for performing transactional memory may also be used, such as an HTM, an STM, an Unbounded Transactional Memory (UTM) system, a hybrid Transactional Memory system, such as a hardware accelerated STM (HASTM), or any other transactional memory system. For example, HTM features, such as annotation bits, may be utilized to accelerate an STM, such as being set/reset based on accesses to the cache line, which software may interpret and utilize to accelerate transactional tracking/conflict detection on a cache line level.

As stated above, a compiler, when executed, to compile program or application code, may insert operations in application code, the operations, when executed, to provide efficient strong atomic write barriers for non-transactional writes. The compiler may insert operations, which may include functions, calls to functions, groups of operations/instructions, loops, conditional statements, and other executable code to perform the operations described. An illustrative example of pseudo code to be inserted at a non-transactional write is illustrated below in Figure A.

| FIG. A: An embodiment of pseudo code for a read barrier |
| --- |
| A.1: IF (Tx record NOT owned by current processing element { |
| A.2: If (lock release event) { |
| A.3: Flush write buffer (WB) + release WB Tx records} |
| A.4: record previous Tx record value in write buffer |
| A.5: acquire Tx record for current processing element} |
| A.6: Perform write to memory location associated with Tx record |

Here, in line A.1 it is determined if a transaction record (Tx record), which is associated with a memory location to be written to, is owned by the current processing element. If the transaction record is already owned, then operations in lines A.2-A.5 may be elided, i.e. not executed, and the write is performed in line A.6. In this case, the only write barrier operation executed before performing the write is A.1. As a result, subsequent non-transactional writes to the same memory location may be accelerated/optimized by allowing the write to be performed without having to re-acquire the lock/transaction record.

However, if the transaction record is not owned by the current processing element, then a more extensive write barrier is executed. In A.2, it is determined if there is a lock release event. In one embodiment, checking for a lock release event, such as buffer overflow is synchronous. In other words, a lock release flag may be set or a lock release condition may occur, and the write buffer is not flushed until operations A.2 is executed to determine if a lock release event occurred.

Alternatively, operations A.2 may be inserted in handler code to handle an asynchronous lock release event, such as generation of an interrupt in response to a lock release condition occurring. Responsive to the lock release condition, the write buffer is flushed and the transaction records currently held in the write buffer are released. In contrast to checking for a lock release event during execution of a write buffer, checking for a lock release event may also occur synchronously during non-transactional execution. Furthermore, the write buffer may also be flushed in response to a start of transaction.

Continuing the example, at A.4 the previous transaction record value is stored in the write buffer. Often this value is utilized during the release of the transaction records, as the release/un-owned value may be an increment of the previous value. At A.5 the transaction record is acquire for the current processing element. In one embodiment, the acquire includes a call to a library function, which updates the transaction record with an owned value. In another embodiment, the acquire operation may include an atomic read modify write (RMW) instruction to update the transaction record. Either after performing the extensive write barrier or the optimized write barrier, the write is performed at line A.6. Note that operations may be inserted in any order depending on implementation. Furthermore, as stated above, any of the illustrated operations may include calls to functions, as well as be omitted.

Figure 3:
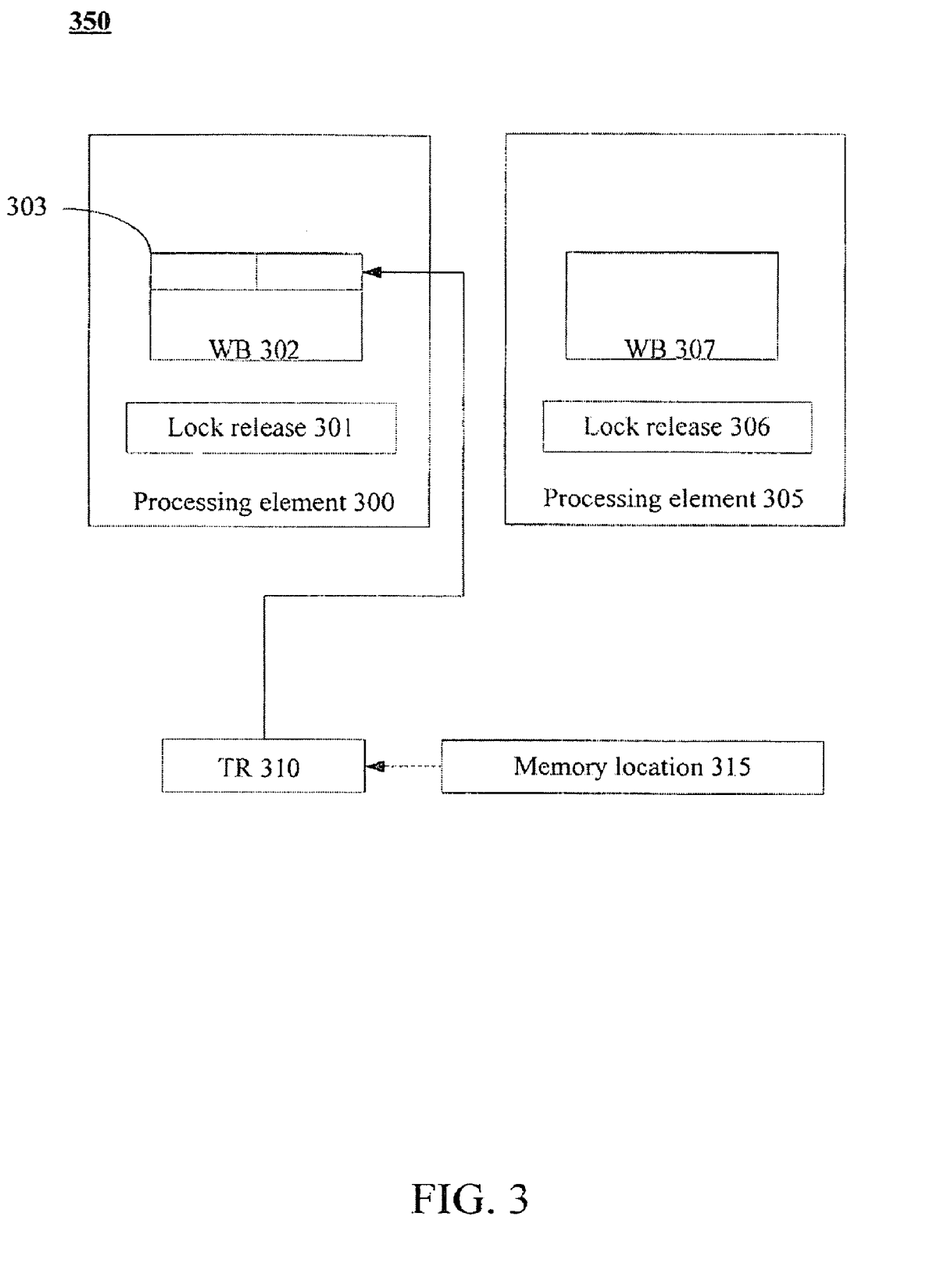
FIG. 3 illustrates an embodiment of a Transactional Memory (TM) system capable of providing efficient non-transactional write barriers.

Turning to FIG. 3, an embodiment of hardware to implement efficient strong atomicity write barriers is illustrated. An integrated circuit 350, such as a physical processor includes two processing elements 300 and 305, such as cores, logical processors, and/or hardware threads. Here, assume processing elements 300 and 305 are cores of physical processor 350. As illustrated, core 300 is associated with lock release element 301 and write buffer 302, while core 306 is associated with write buffer 307 and lock release element 306. Although, each of the resources are illustrated as physically separately associated with each processing element, each of the resources may be physical one group, which is partitioned or shared among the processing elements 300 and 305, accordingly.

Additionally, memory location 315 and transaction record location 310 is shown as illustrated with at least processing element 300. In one embodiment, memory location 315 includes a cache memory location in a cache memory shared by processing elements 300 and 305. Here, virtual address to physical address translation may associate cache location 315 with a physical memory location in a system memory coupled to processor 350. Furthermore, transaction record location 310 may be another cache memory location to cache a transaction record from a table of transaction records held in system memory. In other words, the home locations for data held in location 315 and 310 may be in the system memory and cached in a cache of processor 350. Note that memory location 315 and transaction record 310 may be included in a lower level cache associated with a single processing element, such as a lower-level data cache.

An oversimplified example is discussed below in reference to FIG. 3's depicted hardware and Figure A's pseudo code from above to illustrate an embodiment of operation. Initially transaction record 310 holds an un-owned or unlocked value to indicate memory location 315 is not owned by any processing element. A non-transactional write operation to write to location 315 and inserted strong atomic operations according to pseudo code as illustrated in Figure A are encountered in the execution flow of processing element 300. During execution of operation A.1, it is determined that transaction record 301 is not owned, i.e. transaction record 310 holds an un-owned value, such as a version value.

Therefore, at A.2 it is determined if a lock release event has occurred. In one embodiment, a lock release event includes an overflow of write buffer 302. Other examples of lock release events include attempting to acquire for processing element 300 transaction record 310 that holds an owned value indicating processing element 305 currently owns line 315, and being requested to release locks by another processing element, such as processing element 305. Furthermore, as stated above, another processing element, may request a lock release from a current processing element. Here, the request may be checked during execution of a write barrier, and may also be synchronously checked during non-transactional execution.

In one embodiment, responsive to a lock release event, a field in lock release element 301 is updated to indicate a lock release event has occurred. Here, execution at A.2. checks storage element 301, such as a register or program stack location, to determine if a lock release event has occurred.

Similarly, upon detecting contention for transaction record 310, processing element 305 may update lock release element 301 to request locks/transaction records to be released. As stated above, when a lock release event occurs, either a synchronous or asynchronous response may be utilized to handle the lock release. In one embodiment, at A.3 write buffer 302 is flushed. Based on previous transaction record values held in the write buffer, the transaction records are updated to release locks on corresponding memory locations.

The un-owned value of transaction record 310 is recorded/stored in entry 303 of write buffer 302. As an example, a representation of at least a portion of an address associated with memory location 315 and the previous un-owned value are stored in entry 303. In one embodiment, write buffer 302 resembles a look-up tabled keyed by the representation of the address. At A.5 transaction record 310 is acquired for processing element 300. In one embodiment, a Read Modify Write (RMW) instruction is executed to read transaction record 310 to determine if it is available, modify the un-owned value, and write the modified value to transaction record 310. In another embodiment, a function call to a library acquire function is made to acquire transaction record 310. Note the acquired value may be denoted by a logical value in a specific bit position, such as a logical one in the Most Significant Bit (MSB) position, a signed value, such as an even or an odd value, or a value to indicate which processing element owns transaction record 310.

Figure 4:
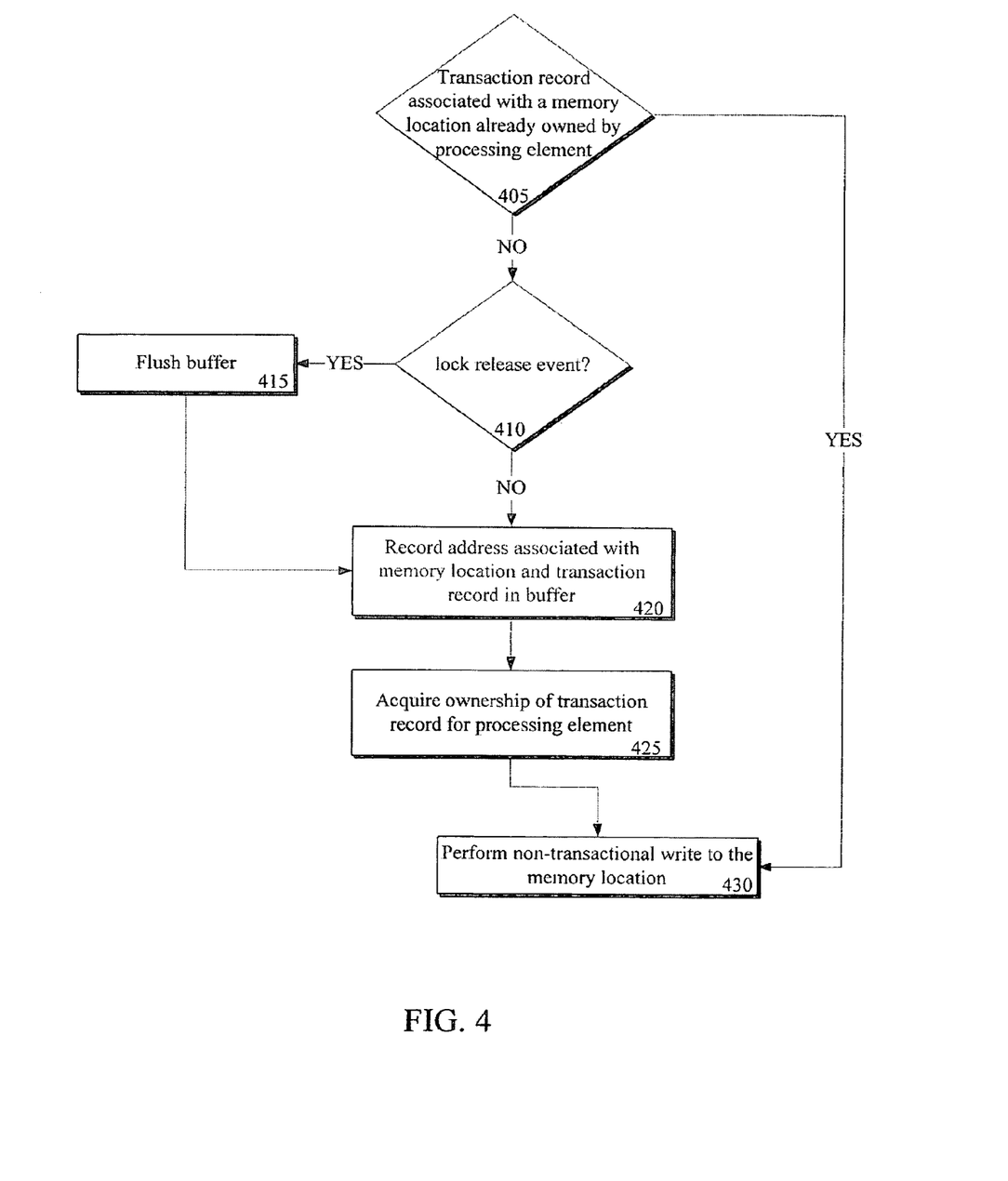
FIG. 4 illustrates an embodiment of a flow diagram for a method of providing efficient non-transaction write barriers in a Transactional Memory (TM) system.

Referring to FIG. 4, an embodiment of a flow diagram for a method for performing efficient strong atomicity non-transactional write barriers is illustrated. Although the flow in FIG. 4 is depicted as substantially serial, any of the flows may take place in any order, as well as in parallel. In flow 405, it is determined if a transaction record associated with a memory location to be written to is already owned by a current processing element. As noted above, program code, when executed, to analyze/compile application code inserts operations, when executed, to perform the flows, methods, and operations discussed below.

As an example, a value from the transaction record is read and/or compared to determine if the transaction record is owned by the processing element. If the processing element is already owned, then in flow 430 a non-transactional write to the memory location is performed without having to execute write barrier operations 410-425.

In contrast, if the lock is owned by another processing element in flow 405, then execution vectors to a write barrier. Here, a function call or other operations, when executed, to perform flows 410-425. In flow 410, it is determined if a lock release event has occurred. Examples of lock release events include an overflow of a buffer, attempting to acquire a transaction record owned by another processing element, and being requested to release transaction records by another processing element. As stated above, these events may be generated/handled synchronously. As another example, a request by another thread to release locks may be handled asynchronously. In one embodiment, in flow 415 the buffer holding previous transaction record values is flushed in response to detecting a lock release event. Based off the previous transaction record values, the transaction records are released, i.e. updated to an un-owned state.

In flow 420, an address associated with the memory location and a transaction record is stored/recorded in the buffer. The address may be a virtual address, physical address, a portion of an address, or a representation thereof. Furthermore, a hash value of any of the addresses associated with the memory location may be held in the buffer. Next, in flow 425, a transaction record associated with the memory location is acquired. In one embodiment, an acquire transaction record function is called to acquire the transaction record. As another example, operations, such as a Read Modify Write (RMW) operation, are inserted, when executed, to acquire the transaction record. After performing the write barrier operations, the non-transactional write is performed in flow 430.

As can be seen from above, optimized strong atomic write barrier operations may be utilized to accelerate non-transactional writes. Upon an initial write to a memory location, full write barriers, such as recording and acquiring a transaction record, are executed. The transaction records/locks are held until a lock release event is detected. As a result, subsequent non-transactional writes are accelerated by eliding write barrier operations, such as recording and acquiring the transaction record.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; or flash memory devices.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
   determining if a lock associated with a memory location is owned by a processing element;
   in response to determining the lock is not owned by the processing element:
   writing an entry to a buffer, the entry including a value of the lock and an address associated with the memory location, and
   acquiring ownership of the lock for the processing element; and
   executing a non-transactional write operation with the processing element in response to the lock being owned by the processing element.

2. The method of claim 1, wherein determining if a lock associated with a memory location is owned by a processing element comprises determining the value of the lock associated with the memory location and comparing the value of the lock to a processing element value to determine if the lock value indicates the lock associated with the memory location is owned by the processing element.

3. The method of claim 1, further comprising determining the buffer is full; and flushing the write buffer.

4. The method of claim 3, wherein flushing the write buffer comprises flushing a plurality of entries of the buffer and releasing a plurality of locks referenced in the plurality of entries in response to flushing the plurality of entries.

5. The method of claim 3, wherein determining the buffer is full comprises handling an asynchronously generated interrupt in response to filling the buffer to determine the buffer is full.

6. The method of claim 1, wherein determining the buffer is full is also in response to determining the lock is not owned by the processing element, and wherein determining the buffer is full comprises polling the buffer to determine if the buffer is full.

7. A non-transitory machine readable medium including code, when executed by a machine, causes the machine to perform the operations of:
   determining if a processing element owns a software transactional lock for an address associated with a data object before performing a non-transactional write operation;
   executing a write barrier for the non-transactional write operation before performing the non-transactional write operation in response to determining the processing element does not own the software transactional lock for the address associated with the data object by logging an un-owned value of the software transactional lock and the address in a storage area and acquiring the software transactional lock; and
   performing the non-transactional write operation without executing the write barrier in response to determining the processing element owns the software transactional lock for the address associated with the data object.

8. The machine readable medium of claim 7, wherein acquiring the software transactional lock includes updating the software transactional lock from the un-owned value to an owned value.

9. The machine readable medium of claim 8, wherein the code, when executed by the machine, further causes the machine to perform the operations of: not returning the software transactional lock from the owned value to the un-owned value until a non-transactional lock release event is encountered.

10. The machine readable medium of claim 9, wherein the non-transactional lock release event includes determining a lock release storage element holds a lock release value, and wherein the lock release storage element is to be updated by a second processing element to the lock release value in response to the second processing element attempting to update the transaction record to hold a second owned value to indicate the second processing element owns the memory location when the transaction record holds the first owned value to indicate the processing element owns the memory location.

11. The machine readable medium of claim 9, wherein the storage area includes a write buffer, and wherein the lock release event is selected from a group consisting of overflowing the write buffer, starting execution of a transaction, and attempting to acquire the software transactional lock with a second processing element when the software transactional lock holds the owned value responsive to a first processing element updating the software transactional lock from the un-owned value to the owned value.

12. The machine readable medium of claim 9, wherein the storage area includes a write buffer, and wherein the write buffer is to be flushed in response to encountering the non-transactional lock release event.

13. A method comprising
determining if a processing element owns a software transactional lock for an address associated with a data object before performing a non-transactional write operation;
executing a write barrier for the non-transactional write operation before performing the non-transactional write operation in response to determining the processing element does not own the software transactional lock for the address associated with the data object by logging an un-owned value of the software transactional lock and the address in a storage area; and acquiring the software transactional lock; and
performing the non-transactional write operation without executing the write barrier in response to determining the processing element owns the software transactional lock for the address associated with the data object.

14. The method of claim 13, wherein acquiring the software transactional lock includes updating the software transactional lock from the un-owned value to an owned value.

15. The method of claim 14, further comprising: not returning the software transactional lock from the owned value to the un-owned value until a non-transactional lock release event is encountered.

16. The method of claim 15, wherein the non-transactional lock release event includes determining a lock release storage element holds a lock release value, and wherein the lock release storage element is to be updated by a second processing element to the lock release value in response to the second processing element attempting to update the transaction record to hold a second owned value to indicate the second processing element owns the memory location when the transaction record holds the first owned value to indicate the processing element owns the memory location.

17. The method of claim 15, wherein the storage area includes a write buffer, and wherein the lock release event is selected from a group consisting of overflowing the write buffer, starting execution of a transaction, and attempting to acquire the software transactional lock with a second processing element when the software transactional lock holds the owned value responsive to a first processing element updating the software transactional lock from the un-owned value to the owned value.

18. The method of claim 15, wherein the storage area includes a write buffer, and wherein the write buffer is to be flushed in response to encountering the non-transactional lock release event.

* * * * *